US009650539B2

(12) United States Patent
Kuo et al.

(10) Patent No.: US 9,650,539 B2
(45) Date of Patent: May 16, 2017

(54) THERMOSETTING COMPOSITIONS BASED ON UNSATURATED POLYESTERS AND PHENOLIC RESINS

(71) Applicant: Eastman Chemical Company, Kingsport, TN (US)

(72) Inventors: Thauming Kuo, Kingsport, TN (US); Phillip Bryan Hall, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/524,514

(22) Filed: Oct. 27, 2014

(65) Prior Publication Data

US 2016/0115348 A1    Apr. 28, 2016

(51) Int. Cl.
C09D 167/06 (2006.01)
C08L 67/06 (2006.01)

(52) U.S. Cl.
CPC ............ *C09D 167/06* (2013.01); *C08L 67/06* (2013.01); *C08J 2367/06* (2013.01); *C08J 2367/07* (2013.01)

(58) Field of Classification Search
CPC .......................... C08J 2367/06; C08J 2367/07
See application file for complete search history.

(56) References Cited

U.S. PATENT DOCUMENTS

| | | | |
|---|---|---|---|
| 3,018,272 A | 1/1962 | Griffing et al. | |
| 3,033,822 A | 5/1962 | Kibler et al. | |
| 3,075,952 A | 1/1963 | Coover, Jr. et al. | |
| 3,108,083 A * | 10/1963 | Laganis ................. | C08G 63/20 428/458 |
| 3,216,884 A | 11/1965 | O'Donnell | |
| 3,227,764 A | 1/1966 | Martin et al. | |
| 3,312,645 A | 4/1967 | George et al. | |
| 3,313,777 A | 4/1967 | Elam et al. | |
| 3,345,313 A | 10/1967 | Ruhf et al. | |
| 3,484,339 A | 12/1969 | Caldwell | |
| 3,502,620 A | 3/1970 | Caldwell | |
| 3,528,947 A | 9/1970 | Lappin et al. | |
| 3,538,187 A | 11/1970 | Feltzen | |
| 3,734,874 A | 5/1973 | Kibler et al. | |
| 3,772,227 A | 11/1973 | Kapalko et al. | |
| 3,779,993 A | 12/1973 | Kibler et al. | |
| 3,789,044 A | 1/1974 | Taft et al. | |
| 3,800,004 A * | 3/1974 | Sherwood ............. | C08F 299/04 523/509 |
| 3,856,830 A | 12/1974 | Kuehn | |
| 4,054,681 A | 10/1977 | Brüning et al. | |
| 4,074,061 A | 2/1978 | Musser | |
| 4,076,766 A | 2/1978 | Simms | |
| 4,119,680 A | 10/1978 | Vachon | |
| 4,120,847 A | 10/1978 | Culbertson | |
| 4,196,109 A * | 4/1980 | Laganis ................. | C08G 63/48 428/458 |
| 4,264,671 A | 4/1981 | Gillern et al. | |
| 4,267,279 A | 5/1981 | Howell | |
| 4,299,933 A | 11/1981 | McConnell et al. | |
| 4,304,901 A | 12/1981 | O'Neill et al. | |
| 4,322,508 A | 3/1982 | Peng et al. | |
| 4,338,379 A | 7/1982 | Strolle et al. | |
| 4,350,807 A | 9/1982 | McConnell et al. | |
| 4,363,908 A | 12/1982 | Joyner et al. | |
| 4,397,989 A | 8/1983 | Adesko | |
| 4,433,119 A | 2/1984 | Brode et al. | |
| 4,480,077 A | 10/1984 | Hefner, Jr. | |
| 4,525,504 A | 6/1985 | Morris et al. | |
| 4,525,544 A | 6/1985 | Nelson et al. | |
| 4,581,093 A | 4/1986 | Noyes et al. | |
| 4,585,854 A | 4/1986 | Tung et al. | |
| 4,698,391 A | 10/1987 | Yacobucci et al. | |
| 4,716,200 A | 12/1987 | Berghoff | |
| 4,724,173 A | 2/1988 | Rockett et al. | |

(Continued)

FOREIGN PATENT DOCUMENTS

BE       615850       7/1962
CA    2 111 927 A1    6/1994
(Continued)

OTHER PUBLICATIONS

ASTM D4752-10; Standard Practice for Measuring MEK Resistance of Ethyl Silicate (Inorganic) Zinc-Rich Primers by Solvent Rub.
ASTM D4274-11; Standard Test Methods for Testing Polyurethane Raw Materials: Determination of Hydroxyl Numbers of Polyols.
Witzeman et al.; "Comparison of Methods for the Preparation of Acetoacetylated Coating Resins"; Journal of Coatings Technology; vol. 62; No. 789; Oct. 1990; pp. 101-112.
Narayan et al.; "Properties of acetoacetylated hydroxylated polyesters based polyurethane coatings"; Progress in Organic Coatings; 45; (2002); pp. 59-67.
International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
(Continued)

*Primary Examiner* — Michael A Salvitti
(74) *Attorney, Agent, or Firm* — Matthew W. Smith; Dennis V. Carmen

(57) ABSTRACT

A thermosetting composition having:
I) an unsaturated curable polyester comprising the residues of an α,β-unsaturated polycarboxylic acid compound, said α,β-unsaturated polycarboxylic acid compound having at least two carboxylic acid groups or at least one anhydride group, and having at least one unsaturation in a position that is α,β relative to a carbonyl group and not located on an aromatic ring; and
II) a phenolic resin having at least one methylol group.
The unsaturated curable polyester resin can be dispersed in water or dissolved in a solvent and is suitable for waterborne or solventborne coating compositions. Phenolic based crosslinking coating compositions that contain these unsaturated curable polyester resins are curable at elevated temperatures.

59 Claims, No Drawings

(56) References Cited

U.S. PATENT DOCUMENTS

| | | | |
|---|---|---|---|
| 4,737,551 A * | 4/1988 | Dervan | C08G 18/831 525/440.02 |
| 4,751,267 A | 6/1988 | Berghoff | |
| 4,771,101 A * | 9/1988 | Pruett | C08H 6/00 523/510 |
| 4,859,760 A | 8/1989 | Light, Jr. et al. | |
| 4,910,292 A | 3/1990 | Blount | |
| 4,939,233 A | 7/1990 | Jenkins et al. | |
| 4,959,259 A | 9/1990 | Guilbaud | |
| 5,017,679 A | 5/1991 | Chang et al. | |
| 5,023,367 A | 6/1991 | Calbo, Jr. et al. | |
| 5,025,086 A | 6/1991 | Blount, Jr. et al. | |
| 5,097,006 A | 3/1992 | Kapilow et al. | |
| 5,124,388 A | 6/1992 | Pruett et al. | |
| 5,160,792 A | 11/1992 | Barbee et al. | |
| 5,218,042 A | 6/1993 | Kuo et al. | |
| 5,245,002 A | 9/1993 | Kuo | |
| 5,254,637 A | 10/1993 | Witzeman et al. | |
| 5,256,759 A | 10/1993 | Kuo | |
| 5,256,761 A | 10/1993 | Blount, Jr. | |
| 5,288,820 A | 2/1994 | Rector, Jr. et al. | |
| 5,290,631 A | 3/1994 | Fleury et al. | |
| 5,306,567 A | 4/1994 | Kuo et al. | |
| 5,321,118 A | 6/1994 | Hubbs et al. | |
| 5,326,820 A | 7/1994 | Hoffmann et al. | |
| 5,344,872 A | 9/1994 | Debord et al. | |
| 5,349,026 A | 9/1994 | Emmons et al. | |
| 5,369,210 A | 11/1994 | George et al. | |
| 5,371,148 A | 12/1994 | Taylor et al. | |
| 5,393,609 A | 2/1995 | Chang et al. | |
| 5,393,840 A | 2/1995 | Kuo | |
| 5,393,849 A | 2/1995 | Srinivasan et al. | |
| 5,397,641 A | 3/1995 | Moens et al. | |
| 5,416,187 A | 5/1995 | Kuo et al. | |
| 5,439,988 A | 8/1995 | Moens et al. | |
| 5,464,909 A | 11/1995 | Chang et al. | |
| 5,498,668 A | 3/1996 | Scott | |
| 5,541,268 A | 7/1996 | Fenn et al. | |
| 5,554,701 A | 9/1996 | Chang et al. | |
| 5,596,037 A | 1/1997 | Moens et al. | |
| 5,646,237 A | 7/1997 | George et al. | |
| 5,654,347 A | 8/1997 | Khemani et al. | |
| 5,696,176 A | 12/1997 | Khemani et al. | |
| 5,852,120 A | 12/1998 | Bederke et al. | |
| 5,919,873 A | 7/1999 | Irving | |
| 5,955,565 A | 9/1999 | Morris et al. | |
| 5,993,975 A | 11/1999 | Tanaka et al. | |
| 6,087,464 A | 7/2000 | Swarup et al. | |
| 6,120,851 A | 9/2000 | Borgholte et al. | |
| 6,184,311 B1 | 2/2001 | O'Keeffe et al. | |
| 6,211,309 B1 | 4/2001 | McIntosh et al. | |
| 6,248,843 B1 | 6/2001 | Panandiker et al. | |
| 6,255,366 B1 | 7/2001 | Adams et al. | |
| 6,265,072 B1 | 7/2001 | Fagerburg | |
| 6,423,816 B1 | 7/2002 | Wamprecht et al. | |
| 6,444,781 B1 | 9/2002 | Kuo et al. | |
| 6,780,523 B2 | 8/2004 | Kuo et al. | |
| 6,887,937 B1 | 5/2005 | Vandevoorde et al. | |
| 6,992,133 B2 | 1/2006 | Yokoyama et al. | |
| 6,995,194 B2 | 2/2006 | Moens et al. | |
| 7,087,672 B2 | 8/2006 | Yuan et al. | |
| 7,141,625 B2 | 11/2006 | Komazaki et al. | |
| 8,163,850 B2 | 4/2012 | Marsh et al. | |
| 8,168,721 B2 | 5/2012 | Marsh et al. | |
| 8,324,316 B2 | 12/2012 | Powell et al. | |
| 8,449,960 B2 | 5/2013 | Skillman et al. | |
| 8,519,055 B2 | 8/2013 | Marsh et al. | |
| 8,524,834 B2 | 9/2013 | Marsh et al. | |
| 8,580,872 B2 | 11/2013 | Kuo et al. | |
| 8,663,765 B2 | 3/2014 | Skillman et al. | |
| 9,029,460 B2 | 5/2015 | Marsh et al. | |
| 9,029,461 B2 | 5/2015 | Marsh et al. | |
| 9,096,772 B2 | 8/2015 | Lespinasse et al. | |
| 2001/0051706 A1 | 12/2001 | George et al. | |
| 2002/0086154 A1 | 7/2002 | Miller et al. | |
| 2002/0103329 A1 | 8/2002 | Koldijk et al. | |
| 2003/0083425 A1 | 5/2003 | Morimoto et al. | |
| 2003/0113462 A1 | 6/2003 | Hirose et al. | |
| 2003/0205852 A1 | 11/2003 | Porter | |
| 2004/0024140 A1 | 2/2004 | Fujita et al. | |
| 2004/0087736 A1 | 5/2004 | Wu et al. | |
| 2005/0176859 A1 | 8/2005 | Tinkl et al. | |
| 2006/0079650 A1 | 4/2006 | Stevenson et al. | |
| 2006/0286383 A1 | 12/2006 | Gilmer | |
| 2007/0020557 A1 | 1/2007 | Yao et al. | |
| 2007/0092746 A1 | 4/2007 | Wayton et al. | |
| 2007/0232778 A1 | 10/2007 | Moody et al. | |
| 2007/0276065 A1 | 11/2007 | Barton et al. | |
| 2008/0092776 A1 | 4/2008 | Stockl et al. | |
| 2008/0135060 A1 | 6/2008 | Kuo et al. | |
| 2008/0139687 A1 | 6/2008 | Woods et al. | |
| 2009/0047524 A1 | 2/2009 | Yaoi et al. | |
| 2009/0110843 A1 * | 4/2009 | Halahmi | C09D 11/101 427/511 |
| 2010/0204363 A1 | 8/2010 | Marsh et al. | |
| 2010/0204388 A1 | 8/2010 | Marsh et al. | |
| 2010/0204392 A1 | 8/2010 | Marsh et al. | |
| 2010/0204401 A1 * | 8/2010 | Marsh | C08G 18/4238 524/761 |
| 2010/0204413 A1 | 8/2010 | Powell et al. | |
| 2010/0297422 A1 | 11/2010 | Lucas | |
| 2011/0315591 A1 | 12/2011 | Lespinasse et al. | |
| 2012/0101187 A1 | 4/2012 | Kuo et al. | |
| 2012/0172520 A1 | 7/2012 | Marsh et al. | |
| 2012/0202920 A1 | 8/2012 | Marsh et al. | |
| 2013/0023604 A1 | 1/2013 | Kuo et al. | |
| 2013/0296470 A1 | 11/2013 | Marsh et al. | |
| 2013/0296488 A1 | 11/2013 | Marsh et al. | |
| 2013/0324640 A1 | 12/2013 | Parish | |
| 2014/0018496 A1 | 1/2014 | Kuo et al. | |
| 2014/0296406 A1 | 10/2014 | Marsh et al. | |
| 2014/0296407 A1 | 10/2014 | Marsh et al. | |
| 2014/0303283 A1 | 10/2014 | Ding et al. | |
| 2015/0034522 A1 | 2/2015 | Itou et al. | |
| 2015/0099827 A1 | 4/2015 | Hagiwara et al. | |
| 2015/0099837 A1 | 4/2015 | Argyropoulos et al. | |
| 2016/0115274 A1 * | 4/2016 | Kuo | C08G 63/199 524/236 |
| 2016/0115345 A1 * | 4/2016 | Kuo | C09D 167/02 427/427.4 |
| 2016/0115347 A1 * | 4/2016 | Kuo | C09D 167/02 524/361 |
| 2016/0115348 A1 * | 4/2016 | Kuo | C08L 67/06 427/385.5 |

FOREIGN PATENT DOCUMENTS

| | | |
|---|---|---|
| EP | 1 273 626 A1 | 1/2003 |
| EP | 1 647 564 | 4/2006 |
| GB | 1 044 015 | 9/1966 |
| GB | 1 115 189 A | 5/1968 |
| GB | 1 130 558 | 10/1968 |
| GB | 2 025 998 B | 10/1982 |
| JP | 03-038281 | 2/1991 |
| JP | 08-073784 | 3/1996 |
| JP | 09-003341 | 1/1997 |
| JP | 2002-235038 | 8/2002 |
| JP | 2004-339493 A | 12/2004 |
| JP | 2006-233068 | 9/2006 |
| WO | WO 94/01506 | 1/1994 |
| WO | WO 94/12557 | 6/1994 |
| WO | WO 95/01407 | 1/1995 |
| WO | WO 96/33229 | 10/1996 |
| WO | WO 01/48097 A1 | 7/2001 |
| WO | WO 2006/083343 | 8/2006 |
| WO | WO 2006/138198 | 12/2006 |
| WO | WO 2007/001567 | 1/2007 |
| WO | WO 2007/001571 A1 | 1/2007 |
| WO | WO 2007/078851 | 7/2007 |
| WO | WO 2013/098218 A1 | 7/2013 |
| WO | WO 2014/203857 A1 | 12/2014 |
| WO | WO 2015/156094 A1 | 10/2015 |

(56) References Cited

FOREIGN PATENT DOCUMENTS

OTHER PUBLICATIONS

International Search Report and Written Opinion for PCT/US2010/000215 dated Apr. 7, 2010.
International Search Report and Written Opinion for PCT/US2010/000216 dated Mar. 19, 2010.
International Search Report and Written Opinion for PCT/US2015/057524 dated Jun. 17, 2016.
Anonymous, "The Use of Cycloaliphatic Diacids and Anhydrides as Monomers for Polyester Polymers to Improve their Compatibility with Acrylic Polymers", Research Disclosure, 360, (1994), pp. 229-230.
Couchman, P. R.; "Compositional Variation of Glass-Transition Temperatures. 2. Application of the Thermodynamic Theory to Compatible Polymer Blends"; Macromolecules 1978, 11(6); pp. 1156-1161.
Heidt, et al., "Florida weathering of Isophthalic Acid-Based, Melamine-Crosslinked Polyester Coatings", Proceedings of the Twenty-Seventh International Waterborne, High Solids and Powder Coatings Symposium (2000), $27^{th}$295-307.
Husbands, M.J., et al., "Polyester Resubgs", A Manual of Resins for Surface Coatings, vol. III, pp. 63-167.
Jorissen, D.A., et al., "Higher Solids Polyurethane Coatings", Proceedings of the International Waterborne, High-Solids and Powder Coatings Symposium, (1992), $19^{th}$ ed. pp. 182-195.
"Coating Processes (Powder Technology)"; Kirk-Othmer Encyclopedia of Chemical Technology, $4^{th}$ Edition, vol. 6, p. 641.
Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.
Oldring, P.K.T., et al., "Vinyl and Acrylic Monomers", A Manual of Resins for Surface Coatings, vol. II, pp. 121-210.
Oldring, P.K.T. et al.; Resins for Surface Coatings; vol. III; pp. 63-167; SITA Technology; London, UK; 1987.
Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Vandevoorde, P., et al. "Making solid gains Novel acrylic and polyester polyols reduce VOCs in solventborne urethanes", European Coatings Journal (2005) (9) pp. 22-24, 26-29.
Wicks, Zeno Jr., et al., "Polyester Resings", Organic Coatings Science and Technology, $2^{nd}$ ed., 13, (1999), p. 246-257.
Co-pending U.S. Appl. No. 14/026,424, filed Sep. 13, 2013, Kuo et al.
Non-Final Office Action dated Nov. 16, 2015 received in co-pending U.S. Appl. No. 14/026,424.
Final Office Action dated Mar. 3, 2016 received in co-pending U.S. Appl. No. 14/026,424.
Co-pending U.S. Appl. No. 15/172,288, filed Jun. 3, 2016, Kuo et al.
Co-pending U.S. Appl. No. 14/524,509, filed Oct. 27, 2014, Kuo et al.
Non-Final Office Action dated Sep. 28, 2015 received in co-pending U.S. Appl. No. 14/524,509.
Notice of Allowance dated Mar. 10, 2016 received in co-pending U.S. Appl. No. 14/524,509.
Notice of Allowance dated Jun. 10, 2016 received in co-pending U.S. Appl. No. 14/524,509.
Co-pending U.S. Appl. No. 14/540,490, filed Nov. 13, 2014, Kuo et al.
Non-Final Office Action dated May 12, 2016 received in co-pending U.S. Appl. No. 14/540,490.
Co-pending U.S. Appl. No. 14/683,278, filed Apr. 10, 2015, Kuo et al.
Non-Final Office Action dated May 4, 2016 received in co-pending U.S. Appl. No. 14/683,278.
Co-pending U.S. Appl. No. 14/716,027, filed May 19, 2015, Zhou et al.
Co-pending U.S. Appl. No. 14/865,112, filed Sep. 25, 2015, Inglefield et al.
Co-pending U.S. Appl. No. 14/922,846, filed Oct. 26, 2016, Kuo et al.
Co-pending U.S. Appl. No. 15/078,537, filed Mar. 23, 2016, Zhou et al.
International Search Report and Written Opinion for PCT/US2015/057529 dated Jan. 27, 2016.
International Search Report and Written Opinion for PCT/US2012/045357 dated Sep. 24, 2012.
ASTM D522; Standard Test Methods for Mandrel Bend Test of Attached Organic Coatings.
ASTM D1639-90; Standard Test Method for Acid Value of Organic Coating Materials.
ASTM D2794; Standard Test Method for Resistance of Organic Coatings to the Effect of Rapid Deformation (Impact).
ASTM D3359-09$^{\epsilon 2}$; Standard Test Methods for Measuring Adhesion by Tape Test.
ASTM D3363; Standard Test Method for Film Hardness by Pencil Test.
ASTM D3418; Standard Test Method for Transition Temperatures and Enthalpies of Fusion and Crystallization of Polymers by Differential Scanning Calorimetry.
ASTM D4287; Standard Test Method for High-Shear Viscosity Using a Cone/Plate Viscometer.
ASTM D4366; Standard Test Method for Hardness of Organic Coatings by Pendulum Damping Tests.
ASTM D6279; Standard Test Method for Rub Abrasion Mar Resistance of High Gloss Coatings.
Biedermann et al.; "Phenolic resins for can coatings: II. Resoles based on cresol/phenol mixtures of tert. butyl phenol"; LWT—Food Science and Technology; 39; (2006); pp. 647-659 (Elsevier).
The Chemisty of Polyurethane Coatings, Technical Publication, p. 20, by Bayer Material Science, 2005.
Zhang, Musan et al.; "Tailoring adhesive performance of sulfonated segmented block copolymers"; Database CA [Online]; Chemical Abstracts Service; XP002682877.
International Search Report and Written Opinion for PCT/US2016/32646 dated Aug. 16, 2016.

* cited by examiner

THERMOSETTING COMPOSITIONS BASED ON UNSATURATED POLYESTERS AND PHENOLIC RESINS

1. FIELD OF THE INVENTION

This invention pertains to thermosetting coating compositions, and more particularly to thermosetting coating compositions containing phenolic resins and $\alpha,\beta$-unsaturated polycarboxylic acid compounds.

2. BACKGROUND OF THE INVENTION

Metal containers are commonly used for food and beverage packaging. The containers are typically made of steel or aluminum. A prolonged contact between the metal and the filled product can lead to corrosion of the container. To prevent direct contact between filled product and metal, a coating is typically applied to the interior of the food and beverage cans. In order to be effective, such a coating must have adequate properties that are needed for protecting the packaged products, such as adhesion, corrosion resistance, chemical resistance, flexibility, stain resistance, and hydrolytic stability. Moreover, the coating must be able to withstand processing conditions during can fabrication and food sterilization. Coatings based on a combination of epoxy and phenolic resins are known to be able to provide a good balance of the required properties and are most widely used. There are industry sectors moving away from food contact polymers made with bisphenol A (BPA) and bisphenol. A diglycidyl ether (BADGE), which are the building blocks of the epoxy resins. Thus, there exists a desire for the replacement of epoxy resin used in interior can coatings.

Polyester has been of particular interest to the coating industry to be used as a replacement for epoxy resin because of its comparable properties such as flexibility and adhesion. It is known by one skilled in the art that crosslinking between common polyester and phenolic resin is too poor to provide adequate properties for use in interior can coatings. Specifically, conventional polyesters having hydroxyl functionalities are not reactive enough with phenolic resins under curing conditions to provide adequate cross-linking density, resulting a coating that lacks good solvent resistance.

There remains a need for a coating system based on curable polyester resins and phenolic resins that is capable of providing effective crosslinking to achieve the desirable coating properties.

3. SUMMARY OF THE INVENTION

In an effort to search for functional polyesters that are capable of crosslinking with phenolic resins to provide desirable coating properties, the present inventors have surprisingly discovered that polyesters synthesized with an $\alpha,\beta$-ethylenically unsaturated carboxyl compound are curable with resole phenolic resins. Coatings based on such polyesters and resole phenolic resins are found to exhibit excellent solvent resistance, indicating effective crosslinking of the two components.

Thus, there is now provided a thermosetting composition comprising:
a) an unsaturated curable polyester comprising the residues of an $\alpha,\beta$-unsaturated polycarboxylic acid compound, said $\alpha,\beta$-unsaturated polycarboxylic acid compound having at least two carboxylic acid groups or at least one anhydride group, and having at least one unsaturation that is in the $\alpha,\beta$ position relative to a carbonyl group and is not located on an aromatic ring; and
b) a phenolic resin substituted with at least one methylol group.

There is now also provided a thermosetting composition comprising:
I) an unsaturated polyester comprising the residues of:
  a) polyhydroxy compounds comprising:
    (i) a diol in an amount of 70 mole %-100 mole %; and
    (ii) a polyhydroxyl compound having 3 or more hydroxyl groups in an amount of 0 to 30 mole %;
    wherein the mole % is based on 100% of all moles of polyhydroxyl compounds; and
  b) polycarboxylic compounds comprising
    (i) an $\alpha,\beta$-unsaturated polycarboxylic acid compound; and
    (ii) a polycarboxylic acid compound other than the (b)(i) $\alpha,\beta$-unsaturated polycarboxylic acid compound.
II) a phenolic resin substituted with at least one methylol group.

4. DETAILED DESCRIPTION OF THE INVENTION

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not only the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ alkyl groups" is intended to specifically include and disclose $C_1$ and $C_5$ alkyl groups as well as $C_2$, $C_3$, and $C_4$ alkyl groups.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "polycarboxylic acid", a "residue" is synonymous with "at least one" or "one or more" polyesters, polycarboxylic acids, or residues and is thus intended to refer to both a single or plurality of polyesters, polycarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "unsaturated curable polyester", as used herein, is synonymous with the term "resin" and is intended to mean a polymer prepared by the polycondensation of one or more polycarboxylic acid compounds and one or more polyhydroxyl compounds. The unsaturated curable polyester of the present invention is useful to make a thermoset polymer and is particularly suitable as a resin for coatings.

The term "residue(s)" means the portion of a molecule in the polyester that remains after its reaction to form the unsaturated curable polyester resin.

The phrase "at least a portion" includes a portion or the whole.

The thermosetting composition contains at least:
I) an unsaturated polyester comprising the residues of an α,β-unsaturated polycarboxylic acid compound; and
II) a phenolic resin substituted with at least one methylol group.

At least a portion of the phenolic resin II (or phenoplast) contains phenol moieties substituted with at least one methylol group on the phenolic ring. At least a portion of the methylol substituents are unreacted and available for reaction when added to or combined with the unsaturated curable polyester resin. The phenolic resin desirably contains groups of the following formula (methylol):

—CH$_2$OH

Desirably, at least one methylol substituent is in the ortho position relative to the phenolic hydroxyl group. The phenolic resin is desirably obtained by the reaction of phenols (which for purposes of this disclosure include substituted and unsubstituted phenols) and an aldehyde at an aldehyde:phenol ratio of greater than 1:1, or at least 1.05:1, or at least 1.1:1, or at least 1.2:1, or at least 1.25:1, or at least 1.3:1, or at least 1.35:1, or at least 1.4:1, or at least 1.45:1, or at least 1.5:1, or at least 1.55:1, or at least 1.6:1, or at least 1.65:1, or at least 1.7:1, or at least 1.75:1, or at least 1.8:1, or at least 1.85:1, or at least 1.9:1, or at least 1.95:1, or at least 2:1. The phenolic resin is desirably a resole phenolic resin.

The phenolic resin desirably contains an average of at least one o-methylol substituent per one phenolic hydroxyl group.

The phenolic resin obtained by the condensation of phenols with aldehydes of the general formula RCHO, where R is hydrogen or a hydrocarbon group having 1 to 8 carbon atoms. Specific examples include formaldehyde, acetaldehyde, propionaldehyde, furfuraldehyde, or benzaldehyde. Desirably, the phenolic resin is the reaction product of phenols with formaldehyde.

Various phenols can be used such as phenol, m-cresol, o-cresol, p-cresol, m-alkylphenol, m-phenylphenol, o-alkylphenol, o-phenylphenol, p-alkylphenol, p-phenylphenol, p-butylphenol, resorcinol, 2,6-xylenol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol. 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol m-alkoxyphenol, o-alkoxyphenol, p-phenoxyphenol, o-phenoxyphenol.

The phenolic resins are desirably heat curable. The phenolic resin is desirably not made by the addition of bisphenol A, F, or S (collectively "BPA"). Additionally or in the alternative, the phenolic resin is desirably not made by the addition of a polyhydric phenol.

The phenolic resin can be a reaction product of phenol, meta-, ortho-, or para-cresol, and a stoichiometric excess of formaldehyde. Desirably, the resole phenolic resin is a reaction product based on either unsubstituted phenol or meta-substituted phenol. The most preferred resole phenolic resin is based on unsubstituted phenol.

The resole is desirably of the type that is soluble in alcohol or water. The resole resin can be liquid at 25° C. The resole resin can have a molecular weight Mn from 300 to 450.

Examples of suitable commercial phenolic resins include, but are not limited to, PHENODUR® PR 516/60B, PHENODUR® PR 371/70B, PHENODUR® PR 612/80B, PHENODUR® PR 285/55/IBB, PHENODUR® PR897, PHENODUR® PR520, and PHENODUR® PR565) available from Allnex; BRJ-473, FB-110 XB-50, FB-209 BT-57, SP-1044, SP-1045, HRJ 10518, SP-103 and HRJ-1367 available from SI Group; those with DUREZ® or VARCUM® trade names available from Durex Corp. (e.g. Durez 33162); and those with Bakelite® trade name available from MOMENTIVE (e.g. Bakelite 6535LB, 6581LB, 6812LB).

Desirably, none of the ingredients in the thermosetting composition are synthesized with the addition of BPA, or with the addition of polyhydric phenols.

The classic crosslinking mechanism thought to operate between a phenolic resin and a polyester was a condensation reaction across the hydroxyl groups on the phenolic resin and the polyester polyol, and as a result, the reaction is not sufficiently rapid and does not form an adequate crosslinking density. Such a mechanism can be illustrated as follows:

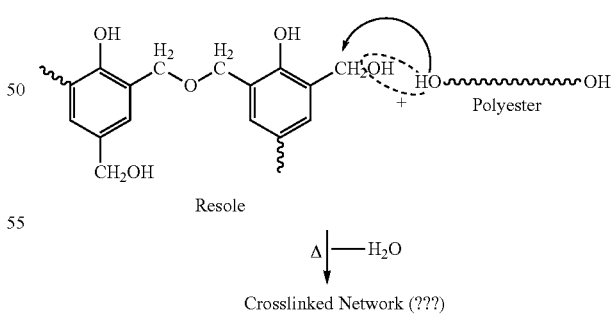

The present invention takes advantage of an additional reaction pathway that improves the crosslinking density of a coating. The present invention allows for the reaction of resole types of phenolic resins with the unsaturated curable polyesters described below that surprisingly reacted quite well and provided coatings having good crosslink density as evidenced by the solvent resistance of the coatings. Ethylenically unsaturated bonds are susceptible to reaction by a neucleophilic agent, so it was surprising the phenolic crosslinking resins, which are thought to act as electrophilic agents through their free methylol groups, reacted so well and improved the crosslinking. Without being bound to a theory, it is believed that under heat, a resole type of phenolic resin can condense water from the resole resin to form an equilibrium intermediate (B) having dual nucleophilic and electrophilic sites or quinone methide having diene structure, that in turn would attack and react with the ethylenical unsaturation sites in the polyester chain to form a ring structure by an addition mechanism according to the following reaction:

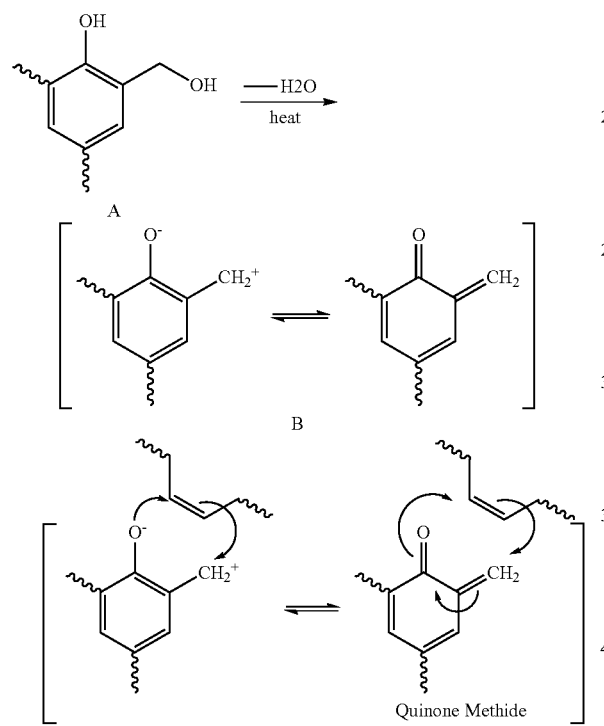

Thus, there is now provided a thermosetting composition comprising:
a) an unsaturated curable polyester comprising the residues of an α,β-unsaturated polycarboxylic acid compound, said α,β-unsaturated polycarboxylic acid compound having at least two carboxylic acid groups or at least one anhydride group, and having at least one unsaturation that is in the α,β position relative to a carbonyl group and is not located on an aromatic ring; and
b) a phenolic resin substituted with at least one methylol group.

There is now also provided a thermosetting composition comprising:
I) an unsaturated polyester comprising the residues of:
a) polyhydroxy compounds comprising:
(i) a diol in an amount of 70 mole %-100 mole %; and
(ii) a polyhydroxyl compound having 3 or more hydroxyl groups in an amount of 0 to 30 mole %; wherein the mole % is based on 100% of all moles of polyhydroxyl compounds; and b) polycarboxylic compounds comprising
(i) an α,β-unsaturated polycarboxylic acid compound; and
(ii) a polycarboxylic acid compound other than the (b)(i) α,β-unsaturated polycarboxylic acid compound.
II) a phenolic resin substituted with at least one methylol group.

The unsaturated curable polyester resin contains the residues of an α,β-unsaturated polycarboxylic acid compound. The unsaturated curable polyester resin is obtained by reacting polyhydroxyl compounds 1(a) with polycarboxyl compounds 1(b).

The polycarboxyl compounds 1(b) may be a polycarboxylic acid compound, a derivative of polycarboxylic acid compound, the anhydride of a polycarboxylic acid, or a combination thereof. Suitable polycarboxylic acid compounds include compounds having at least two carboxylic acid groups. The polycarboxylic acid compound can be a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

The unsaturated curable polyester has at least one residue of an α,β-unsaturated polycarboxylic acid compound. The polycarboxyl compounds (b) used in the synthesis of the unsaturated curable polyester comprise an α,β-unsaturated polycarboxylic acid compound (b)(i) compound. The α,β-unsaturated polycarboxylic acid compound (b)(i) compound used in the invention has at least two carboxylic acid groups, or the anhydride thereof, and at least one unsaturation that is in the α,β position relative to the carbonyl group and is not on an aromatic ring. The α,β-unsaturated polycarboxylic acid compound can be represented by the following general formula (C):

 (C)

The (b)(i) α,β-unsaturated polycarboxylic acid compound can be branched or unbranched, substituted or un-substituted, and can have one or more than one ethylenic unsaturation. The α,β-unsaturated polycarboxylic acid compound can be:
a) a $C_1$-$C_4$ alkyl ester derivative on one or more than one carboxylic acid group, such as a dimethyl ester of the α,β-unsaturated polycarboxylic acid compound; or
b) branched or unbranched with a $C_1$-$C_{16}$ alkyl, cycloalkyl, or aryl group, and a branch can be located on an ethylenic unsaturated carbon atom; or
c) substituted with a halogen atom; or
d) an anhydride of any of the foregoing.

Specific examples include, but are not limited to, maleic anhydride, maleic acid, fumaric acid, itaconic anhydride, itaconic acid, citraconic anhydride, citraconic acid, aconitic acid, aconitic anahydride, oxalocitraconic acid and its anhydride, mesaconic acid or its anhydride, phenyl maleic acid or its anhydride, t-butyl maleic acid or its anhydride, monomethyl fumarate, monobutyl fumarate, methyl maleic acid or its anhydride, or mixtures thereof.

Desirably, the α,β-unsaturated polycarboxylic acid compound can be maleic acid or its anhydride.

The unsaturated curable polyester polymer of the invention contains at least one non-terminal ethylenically unsaturated bond in an α,β position relative to an ester group in the polymer. The ethylenically unsaturated carbons in the unsaturated curable polyester polymer can be pendant groups to the polymer backbone or branches thereof, or linear within the polymer backbone. Terminal or vinyl unsaturation on the unsaturated curable polyester polymer may be present so long as the unsaturated curable polyester polymer contains residues of at least one non-terminal ethylenically unsaturated bond in the α,β position relative to an ester group.

Desirably, the unsaturated curable polyester polymer is not made with a monocarboxylic acid compound having a vinyl group, such as acrylic acid or methacrylic acid.

Desirably, the unsaturated curable polyester polymer does not contain residues of a monocarboxylic acid compound having a vinyl group, such as acrylic acid or methacrylic acid.

The unsaturated curable polyester used in the thermosetting composition of the invention contains residues of α,β-unsaturated polycarboxylic acid compound in an amount effective to improve the solvent resistance of a coating relative to one made with a curable polyester without the α,β-unsaturated polycarboxylic acid compound. Suitable amounts of α,β-unsaturated polycarboxylic acid compound residues present in the unsaturated curable polyester are at least 5 mole %, or at least 7 mole %, or at least 10 mole %, or at least 12 mole %, or at least 15 mole %, and up to 30 mole %, or up to 25 mole %, or up to 20 mole %, each based on the total moles of the components of the curable polyester. Examples of suitable ranges of the α,β-unsaturated polycarboxylic acid compound residues present in the unsaturated curable polyester are, in mole % based on the total moles of the components of the unsaturated curable polyester, 5-30, or 7-30, or 10-30, or 12-30, or 15-30, or 5-25, or 7-25, or 10-25, or 12-25, or 15-25, or 5-20, or 7-20, or 10-20, or 12-20, or 15-20.

Desirably, the unsaturated curable polyester contains residues of α,β-unsaturated polycarboxylic acid compound present in an amount of 10-25, or 15-20, in each case mole % based on the total moles of the components of the unsaturated curable polyester.

The unsaturated curable polyester I is desirably made with α,β-unsaturated polycarboxylic acid compounds in an amount of at least 10 mole %, or at least 15 mole %, or at least 20 mole %, or at least 25 mole %, or at least 30 mole %, and up to 60 mole %, or up to 50 mole %, or up to 40 mole %, each based on 100 mole % of all polycarboxylic (b) compounds used to make the unsaturated curable polyester. Examples of suitable ranges of the α,β-unsaturated polycarboxylic acid compound residues present in the unsaturated curable polyester are, in mole % based on 100 mole % of all polycarboxylic compounds (b) used to make the unsaturated curable polyester, 10-60, or 15-60, or 20-60, or 25-60, or 30-60, or 10-50, or 15-50, or 20-50, or 25-50, or 30-50, or 10-40, or 15-40, or 20-40, or 25-40, or 30-40.

Desirably, the unsaturated curable polyester contains residues of α,β-unsaturated polycarboxylic acid compound present in an amount of 20-50, or 30-40, in each case mole % based on 100 mole % of all polycarboxylic compounds (b).

The unsaturated curable polyester also contains the residues of dicarboxylic acids or ester derivatives thereof other than the α,β-unsaturated polycarboxylic acid compound. The unsaturated curable polyester (I) can contain the residues of:

a) polycarboxylic compounds comprising
   (i) an α,β-unsaturated polycarboxylic acid compound; and
   (ii) polycarboxylic compounds other than b)(i).

The polycarboxylic acid compounds (bii) can be a combination of aromatic polycarboxylic acid compounds and either or both of aliphatic or cycloaliphatic polycarboxylic acid compounds. For example, the polycarboxylic acid compounds (b)(ii) can include aromatic polycarboxylic acid compounds and aliphatic polycarboxylic acids compounds having 2 to 22 carbon atoms; or aromatic polycarboxylic acid compounds and cycloaliphatic polycarboxylic acids compounds having 2 to 22 carbon atoms; or aromatic polycarboxylic acid compounds, aliphatic polycarboxylic acids compounds having 2 to 22 carbon atoms; and cycloaliphatic polycarboxylic acids compounds having 2 to 22 carbon atoms.

Examples of such polycarboxylic compounds (b)(ii) that form the polycarboxylic (b)(ii) residues in the unsaturated curable polyester include those having two or more, desirably only two, carboxylic acid functional groups or their esters. Examples of these compounds include aliphatic dicarboxylic acids, alicyclic dicarboxylic acids, aromatic dicarboxylic acids, derivatives of each, or mixtures of two or more of these acids, or the $C_1$-$C_4$ ester derivatives thereof. Suitable dicarboxylic acids include, but are not limited to, isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, succinic anhydride, succinic acid, adipic acid, 2,6-naphthalenedicarboxylic acid, glutaric acid, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

Desirably, the polycarboxylic component (b)(ii) other than α,β-ethylenically unsaturated carboxyl compound (b)(i), is isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, 2,6-naphthalenedicarboxylic acid, 1,4-naphthalenedicarboxylic acid; 2,5-naphthalenedicarboxylic acid; hexahydrophthalic anhydride, tetrahydrophthalic anhydride, trimellitic anhydride, succinic anhydride, succinic acid, or mixtures thereof. Trimellitic acid or its anhydride is a useful compound to add in order to increase the acid number of the unsaturated curable polyester I if so desired. A useful process for increasing the acid number of the unsaturated curable polyester (I) is a two stage process in which one can react all polyhydroxyl compounds (a) and all other polycarboxylic acid compounds (b) in a reaction mixture, and after the acid number of the reaction mixture has reached or fallen through 20 mg KOH/g, add a difunctional acid or its anhydride to the reaction mixture or the reaction product of the polyhydroxyl compounds (a) and the all other polycarboxyl compounds (b). However, an advantage of the invention is the ability of the ethylenic unsaturation in the unsaturated curable polyester polymer chain to provide reactive crosslink sites with phenolic crosslinking compounds, thereby rendering a two stage process unnecessary.

If desired, the polycarboxylic acid compounds (b)(ii) do not include terephthalic acid or a derivative of terephthalic acid.

More specific examples of some of the suitable polycarboxylic acids b(ii) and/or combinations thereof include:
a) (isophthalic acid or dimethyl isophthalate) and (1,4-cyclohexanedicarboxylic acid, 1,3-cyclohexanedicarboxylic acid, or mixtures thereof); or
b) (isophthalic acid or dimethyl isophthalate)) and (dodecanedioic acid, sebacic acid, azelaic acid, maleic acid, fumaric acid, succinic acid, adipic acid, glutaric acid, itatonic acid, diglycolic acid; or mixtures thereof); or
c) (isophthalic acid or dimethyl isophthalate); or (1,4-cyclohexanedicarboxylic acid, 1,3-cyclohexanedicarboxylic acid, or mixtures thereof) and (dodecanedioic acid, sebacic acid, azelaic acid, maleic acid, fumaric acid, succinic acid, adipic acid, glutaric acid, itatonic acid, diglycolic acid, or mixtures thereof), or
d) 1,4-cyclohexanedicarboxylic acid.

Optionally, in each of examples (a)-(d), terephthalic acid or derivatives thereof are not included.

In each of the embodiments above, anhydride analogs to each of the polycarboxyl compounds (b) described above can be used. This would include the anhydrides of polycarboxylic acids having at least two acyl groups bonded to the same oxygen atom. The anhydrides can be symmetrical or unsymmetrical (mixed) anhydrides. The anhydrides have at least one anhydride group, and can include two, three, four, or more anhydride groups.

Suitable amounts of residues of the polycarboxylic compounds (b)(ii) present in the unsaturated curable polyester are at least 20 mole %, or at least 25 mole %, or at least 30 mole %, based on the total moles of the components of the unsaturated curable polyester. Additionally or in the alternative, the amount of residues of the polycarboxylic compounds (b)(ii) present in the unsaturated curable polyester are up to 45 mole %, or up to 43 mole %, or up to 40 mole %, or up to 38 mole %, or up to 35 mole %, based on the total moles of the components of the unsaturated curable polyester. Examples of suitable ranges of the residues of the polycarboxylic compounds (b)(ii) present in the unsaturated curable polyester are, in mole % based on the total moles of the components of the unsaturated curable polyester, 20-45, or 25-45, or 30-45, or 20-43, or 25-43, or 30-43, or 20-40, or 25-40, or 30-40, or 20-38, or 25-38, or 30-38, or 20-35, or 25-35, or 30-35.

Suitable amounts of polycarboxylic compounds (b)(ii) used to make the unsaturated curable polyester are at least 40 mole %, or at least 50 mole %, or at least 60 mole %, based on 100 mole % of all polycarboxylic compounds (b). Additionally or in the alternative, the amount of polycarboxylic compounds (b)(ii), based on 100 mole % of all polycarboxylic compounds (b), can be up to 90 mole %, or up to 85 mole %, or up to 80 mole %, or up to 75 mole %, or up to 70 mole %. Examples of suitable ranges of the polycarboxylic compounds (b)(ii), in mole % based on 100% of all moles of polycarboxylic compounds (b), are 40-90, or 50-90, or 60-90, or 40-85, or 50-85, or 60-85, or 40-80, or 50-80, or 60-80, or 40-75, or 50-75, or 60-75, or 40-70, or 50-70, or 60-70.

Desirably, the unsaturated curable polyester is made with polycarboxylic compounds (b)(ii) in an amount of 50-80, or 60-70, in each case mole % based on 100% of all moles of the polycarboxylic compounds (b).

The unsaturated curable polyester I is desirably made with, and contains the residues of:
a) polyhydroxyl compounds comprising:
(i) a diol in an amount of 70 mole %-100 mole %; and
(ii) a polyhydroxyl compound having 3 or more hydroxyl groups in an amount of 0 to 30 mole %;

For purposes of calculating quantities, all compounds having at least one hydroxyl group are counted as polyhydroxyl compounds (a). Such compounds include, but are not limited to, mono-ols, diols, polyhydroxyl compounds having 3 or more hydroxyl groups, and for each of the foregoing, can be hydrocarbons of any chain length optionally containing ether groups such as polyether polyols, ester groups such as polyesters polyols, amide groups, amine groups, anhydrides.

The diols (a)(i) have 2 hydroxyl groups and can be branched or linear, saturated or unsaturated, aliphatic or cycloaliphatic $C_2$-$C_{20}$ compounds, the hydroxyl groups being primary, secondary, and/or tertiary, desirably primary. Desirably, the polyhydroxyl compounds are hydrocarbons and do not contain atoms other than hydrogen, carbon and oxygen. Examples of diols (a)(i) include 2,2,4,4-tetraalkylcyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and the like.

The TACD compound can be represented by the general structure:

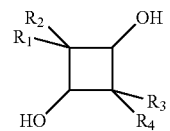

wherein $R_1$, $R_2$, $R_3$, and $R_4$ each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4- diisobutylcyclobutane-1,3-diol, and 2,4-diethyl-2,4-diisoamylcyclobutane-1,3-diol.

Desirably, the diol (a)(i) is 2,2,4,4-tetramethylcyclobutane-1,3-diol (TMCD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. Desirably, at least one of the diols (a)(i) is TMCD.

The diols (a)(i) are desirably present in an amount of at least 70 mole %, or at least 75 mole %, or at least 80 mole %, or at least 85 mole %, or at least 87 mole %, or at least 90 mole %, or at least 92 mole %, based on 100 mole % of all polyhydroxyl compounds. Additionally or in the alternative, the diols (a)(i) can be present in an amount of up to 100 mole %, or up to 98 mole %, or up to 96 mole %, or up to 95 mole %, or up to 93 mole %, or up to 90 mole %, based on 100 mole % of all polyhydroxyl compounds. Suitable ranges include, in mole % based on 100 mole % of all polyhydroxyl compounds (a), 70-100, or 75-100, or 80-100, or 85-100, or 87-100, or 90-100, or 92-100, or 95-100, or 96-100, or 70-98, or 75-98, or 80-98, or 85-98, or 87-98, or 90-98, or 92-98, or 95-93, or 96-93, or 70-93, or 75-93, or 80-93, or 85-93, or 87-93, or 90-93, or 92-93, or 70-90, or 75-90, or 80-90, or 85-90, or 87-90.

The diols (a)(i) are desirably present in an amount of at least 35 mole %, or at least 37 mole %, or at least 40 mole %, or at least 42 mole %, or at least 45 mole %, or at least 46 mole %, based on the total moles of the components of the polyester polymer. Additionally or in the alternative, the diols (a)(i) can be present in an amount of up to 50 mole %, or up to 49 mole %, or up to 48 mole %, or up to 47 mole %, or up to 46 mole %, or up to 45 mole %, based on the total moles of the components of the polyester polymer. Suitable ranges include, in mole % based on the polyester polymer, 35-50, or 37-50, or 40-50, or 42-50, or 45-50, or 46-50, or 35-49, or 37-49, or 40-49, or 42-49, or 45-49, or 46-49, or 35-48, or 37-48, or 40-48, or 42-48, or 45-48, or 46-48, or 35-47, or 37-47, or 40-47, or 42-47, or 45-47, or 46-47, or 35-46, or 37-46, or 40-46, or 42-46, or 45-46, or 35-45, or 37-45, or 40-45, or 42-45.

The polyhydroxyl compounds (a)(ii) having 3 or more hydroxyl groups can be branched or linear, saturated or unsaturated, aliphatic or cycloaliphatic $C_2$-$C_{20}$ compounds, the hydroxyl groups being primary, secondary, and/or tertiary, and desirably at least two of the hydroxyl groups are primary. Desirably, the polyhydroxyl compounds are hydrocarbons and do not contain atoms other than hydrogen, carbon and oxygen. Examples of the polyhydroxyl compounds (a)(ii) include 1,1,1-trimethylol propane, 1,1,1-trimethylolethane, glycerin, pentaerythritol, erythritol, threitol, dipentaerythritol, sorbitol, mixtures thereof, and the like.

The polyhydroxyl compounds (a)(ii), if present, can be present in an amount of at least 1 mole %, or at least 2 mole %, or at least 5 mole %, or at least 8 mole %, or at least 10 mole %, based on 100 mole % of all polyhydroxyl compounds (a). Additionally or in the alternative, the polyhydroxyl compounds (a)(ii) can be present in an amount of up to 30 mole %, or up to 25 mole %, or up to 20 mole %, or up to 15 mole %, or up to 13 mole %, or up to 10 mole %, or up to 8 mole %, based on 100 mole % of all polyhydroxyl compounds (a). Suitable ranges of the polyhydroxyl compounds (a)(ii) include, in mole % based on 100 mole % of all polyhydroxyl compounds (a), 1-30, or 2-30, or 5-30, or 8-30, or 10-30, or 1-25, or 2-25, or 5-25, or 8-25, or 10-25, or 1-20, or 2-20, or 5-20, or 8-20, or 10-20, or 1-15, or 2-15, or 5-15, or 8-15, or 10-15, or 1-13, or 2-13, or 5-13, or 8-13, or 10-13, or 1-10, or 2-10, or 5-10, or 8-10, or 1-8, or 2-8, or 5-8.

The polyhydroxyl compounds (a)(ii) are desirably present in an amount of at least 0.5 mole %, or at least 1 mole %, or at least 2 mole %, or at least 4 mole %, or at least 5 mole %, based on the total moles of the components of the polyester polymer. Additionally or in the alternative, the polyhydroxyl compounds (a)(ii) can be present in an amount of up to 15 mole %, or up to 13 mole %, or up to 10 mole %, or up to 8 mole %, or up to 6 mole %, or up to 5 mole %, or up to 4 mole %, based on the total moles of the components of the polyester polymer. Suitable ranges include, in mole % based on the total moles of the components of the polyester polymer, 0.5-15, or 1-15, or 2-15, or 4-15, or 5-15, or 0.5-13, or 1-13, or 2-13, or 4-13, or 5-13, or 0.5-10, or 1-10, or 2-10, or 4-10, or 5-10, or 0.5-8, or 1-8, or 2-8, or 4-8, or 5-8, or 0.5-6, or 1-6, or 2-6, or 4-6, or 5-6, or 0.5-5, or 1-5, or 2-5, or 4-5, or 0.5-4, or 1-4, or 2-4.

Desirably, all of the polyhydroxyl compounds (a) used to react with the polycarboxylic compounds (b) are hydrocarbons, meaning that they contain only oxygen, carbon, and hydrogen. Optionally, none of the polyhydroxyl compounds (a) contain any ester, carboxyl (—COO—), and/or anhydride groups. Optionally, none of the polyhydroxyl compounds (a) have any carbonyl groups (—CO—). Optionally, none of the polyhydroxyl compounds (a) contain any ether groups. Desirably, the polyhydroxyl compounds (a) have from 2 to 20, or 2 to 16, or 2 to 12, or 2 to 10 carbon atoms.

The unsaturated curable polyester I can have an acid number ranging from 0 to about 120 mg KOH/g and a hydroxyl number ranging from greater than 0 to about 160 mg KOH/g.

The acid number of the unsaturated curable polyester can be adjusted as needed depending on whether a water borne dispersion or solvent borne solution is ultimately desired. However, as noted above, since the ethylenic unsaturation embedded into the polymer chain or directly into the polymer backbone provides reactive sites for crosslinking with phenolic compounds, the acid number does not need to be high to reach an acceptable cross-link density. If desired, however, the unsaturated curable polyester I can also have a high acid number to provide additional cross-linking sites or to provide acidity for neutralization to impart water dispersibility.

The acid number of the unsaturated curable polyester can be up to 120, or not more than 70, or not more than 50, or not more than 40, or not more than 30, or not more than 20, or not more than 10, or not more than 5, or not more than 4, or not more than 3, or not more than 2, or not more than 1, in each case mg KOH/g. Additionally or in the alternative, the acid number can be 0, or at least 1, or at least 2, or at least 5, or at least 10, or at least 20, in each case mg KOH/g. Suitable ranges include 0-120, or 1-120, or 2-120, or 5-120, or 10-120, or 20-120, or 0-70, or 1-70, or 2-70, or 5-70, or 10-70, or 20-70, or 0-50, or 1-50, or 2-50, or 5-50, or 10-50, or 20-50, or 0-40, or 1-40, or 2-40, or 5-40, or 10-40, or 20-40, or 0-30, or 1-30, or 2-30, or 5-30, or 10-30, or 20-30, or 0-20, or 1-20, or 2-20, or 5-20, or 10-20, or 0-10, or 1-10, or 2-10, or 5-10, or 0-5, or 1-5, or 2-5, or 0-4, or 1-4, or 2-4, or 0-3, or 1-3, or 2-3, or 0-2, or 1-2, or 0-1, in each case mg KOH/g. Since a high acid number is not necessary, the unsaturated curable polyester I can have an acid number in the range of 0-10, or 1-10, or 2-10, or 5-10, or 0-5, or 1-5, or 2-5, or 0-4, or 1-4, or 2-4, or 0-3, or 1-3, or 2-3, or 0-2, or 1-2, or 0-1, in each case mg KOH/g, and these ranges are particularly useful in solvent based solutions and coating applications. In aqueous dispersions and waterborne coating applications, the acid number of the unsaturated curable polyester I can be higher in order to impart sufficient water dispersibility after neutralization, and in this case, the acid number of the unsaturated curable polyester I can be 20-120, or 30-120, or 40-120, or 20-70, or 30-70, or 40-70, or 20-60, or 30-60, or 40-60, in each case mg KOH/g.

The hydroxyl number can be within a range of from greater than 0 to 160 mg KOH/g. Suitable ranges of hydroxyl number include greater than 0 to 100, or from 5 to 100, or from 10 to 100, or from 15 to 100, or from 20 to 100, or from 25 to 100, or from 35 to 100, or from 40 to 100, or from 45 to 100, or from 50 to 100, or from 55 to 100, or from 60 to 100, or from 65 to 100, or from 70 to 100, or from 75 to 100, or from 80 to 100, or from 85 to 100, or from 90 to 100, greater than 0 to 90, or from 5 to 90, or from 10 to 90, or from 15 to 90, or from 20 to 90, or from 25 to 90, or from 35 to 90, or from 40 to 90, or from 45 to 90, or from 50 to 90, or from 55 to 90, or from 60 to 90, or from 65 to 90, or from 70 to 90, or from 75 to 90, or from 80 to 90, greater than 0 to 85, or from 5 to 85, or from 10 to 85, or from 15 to 85, or from 20 to 85, or from 25 to 85, or from 35 to 85, or from 40 to 85, or from 45 to 85, or from 50 to 85, or from 55 to 85, or from 60 to 85, or from 65 to 85, or from 70 to 85, or from 75 to 85, greater than 0 to 80, or from 5 to 80, or from 10 to 80, or from 15 to 80, or from 20 to 80, or from 25 to 80, or from 35 to 80, or from 40 to 80, or from 45 to 80, or from 50 to 80, or from 55 to 80, or from 60 to 80, or from 65 to 80, or from 70 to 80, or from 75 to 80, or from greater than 0 to 75, or from 5 to 75, or from 10 to 75, or from 15 to 75, or from 20 to 75, or from 25 to 75, or from 35 to 75, or from 40 to 75, or from 45 to 75, or from 50 to 75, or from 55 to 75, or from 60 to 75, or from 65 to 75, or from greater than 0 to 70, or from 5 to 70, or from 10 to 70, or from 15 to 70, or from 20 to 70, or from 25 to 70, or from 35 to 70, or from 40 to 70, or from 45 to 70, or from 50 to 70, or from 55 to 70, or from 60 to 70, or from greater than 0 to 65, or from 5 to 65, or from 10 to 65, or from 15 to 65, or from 20 to 65, or from 25 to 65, or from 35 to 65, or from 40 to 65, or from 45 to 65, or from 50 to 65, or from 55 to 65, or from greater than 0 to 60, or from 5 to 60, or from 10 to 60, or from 15 to 60, or from 20 to 60, or from 25 to 60, or from 35 to 60, or from 40 to 60, or from 45 to 60, or from 50 to 60, or from 55 to 60, or from greater than 0 to 55, or from 5 to 55, or from 10 to 55, or from 15 to 55, or from 20 to 55, or from 25 to 55, or from 35 to 55, or from 40 to 55, or from 45 to 55, or from 50 to 55, or from greater than 0 to 50, or from 5 to 50, or from 10 to 50, or from 15 to 50, or from 20 to 50, or from 25 to 50, or from 35 to 50, or from 40 to 50, or from greater than 0 to 45, or from 5 to 45, or from 10 to 45, or from 15 to 45, or from 20 to 45, or from 25 to 45, or from 35 to 45, or from 0 to 40, or from 5 to 40, or from 10 to 40, or from 15 to 40, or from 20 to 40, or from 25 to 40, or from 35 to 40, or from greater than 0 to 35, or from 5 to 35, or from 10 to 35, or from 15 to 35, or from 20 to 35, or from 25 to 35.

Desirably, the hydroxyl number of the unsaturated curable polyester I is in a range of 25 to 100, or from 35 to 100, or from 40 to 100, or from 45 to 100, or from 50 to 100, or from 55 to 100, or from 60 to 100, or from 65 to 100, or from 70 to 100, or from 75 to 100, or from 80 to 100, or from 85 to 100, or from 90 to 100, or 25 to 90, or from 35 to 90, or from 40 to 90, or from 45 to 90, or from 50 to 90, or from 55 to 90, or from 60 to 90, or from 65 to 90, or from 70 to 90, or from 75 to 90, or from 80 to 90, or from 25 to 85, or from 35 to 85, or from 40 to 85, or from 45 to 85, or from 50 to 85, or from 55 to 85, or from 60 to 85, or from 65 to 85, or from 70 to 85, or from 75 to 85, or from 25 to 75, or from 35 to 75, or from 40 to 75, or from 45 to 75, or from 50 to 75, or from 55 to 75, or from 60 to 75, or from 65 to 75, or from 25 to 60, or from 35 to 60, or from 40 to 60, or from 45 to 60, or from 50 to 60, or from 55 to 60.

The acid number mentioned herein can be measured by ASTM D1639-90 test method. The hydroxyl numbers mentioned herein can be measured by ASTM D4274-11 test method.

The glass transition temperature (Tg) of the unsaturated curable polyester of the present invention may be from −20° C. to 120° C., from 10° C. to 80° C., from 10° C. to 60° C., from 10° C. to 50° C., from 10° C. to 45° C., from 10° C. to 40° C., from 20° C. to 80° C., from 20° C. to 60° C., from 20° C. to 50° C., from 30° C. to 80° C., from 30° C. to 60° C., from 30° C. to 50° C., or from 35° C. to 60° C. The Tg is measured on the dry polymer using standard techniques, such as differential scanning calorimetry ("DSC"), well known to persons skilled in the art. The Tg measurements of the polyesters are conducted using a "dry polymer," that is, a polymer sample in which adventitious or absorbed water is driven off by heating to polymer to a temperature of about 200° C. and allowing the sample to return to room temperature. Typically, the polyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement.

The number average molecular weight (Mn) of the unsaturated curable polyester of the present invention is not limited, and may be from 1,000 to 20,000, from 1,000 to 15,000, from 1,000 to 12,500, from 1,000 to 10,000, from 1,000 to 8,000, from 1,000 to 6,000, from 1,000 to 5,000, from 1,000 to 4000, from 1,000 to 3,000, from 1,000 to 2,500, from 1,000 to 2,250, or from 1,000 to 2,000, from 1,100 to 4000, from 1,100 to 3,000, from 1,100 to 2,500, from 1,100 to 2,250, or from 1,100 to 2,000 in each case g/mole. The Mn is measured by gel permeation chromatography (GPC) using polystyrene equivalent molecular weight.

This polyester desirably has a low or mid molecular weight, typically an Mn from 1000 to about 20,000 to render it suitable for coating applications. Desirably, the molecular weight of the unsaturated curable polyester resin is not suitable for the fabrication of films, sheets, and other shaped objects by extrusion, casting, blow molding, and other thermoforming processes commonly used for higher molecular weight thermoplastic polymers.

Another example of the thermosetting composition of the invention contains:
I) an unsaturated curable polyester resin comprising the residues of:
 a) polyhydroxyl compounds comprising:
  (i) diol compounds in an amount ranging from 85 to 98 mole %; and
  (ii) polyhydroxyl compounds having at least three hydroxyl groups in an amount ranging from 2 to 15 mole %;
  wherein the amount of (a)(i) and (a)(ii) are based on the total moles of polyhydroxyl compounds (a); and b) polycarboxyl compounds comprising
  (i) α,β-unsaturated polycarboxylic acid compounds in an amount ranging from 10 to 60 mole %, or 25 to 50 mole %, or 25 to 40 mole %; and
  (ii) polycarboxyl compounds other than (b)(i) in an amount ranging from 40 to 90 mole %, or 50 to 75 mole %, or 60 to 75 mole %;
    wherein the amount of (b)(i) and (b)(ii) are based on the total moles of polycarboxyl compounds (b); and
II) a phenolic resin, such as a resole phenolic resin.

The unsaturated curable polyester can have an acid number ranging from 0 to 5 or 35-60 mg KOH/g, a hydroxyl number ranging from 30-90 mg KOH/g. The ranges of acid numbers, hydroxyl numbers, the combinations of each of these, as well as the diols, polycarboxylic acids 1(b) and anhydrides, Mn, Mw, and molar quantities for each ingredient that are mentioned above are also applicable to these unsaturated curable polyester resins.

Desirably, in any of the embodiments of the invention, the (a)(i) diol includes 2,2-dimethyl-1,3-propanediol (neopentyl glycol); 1,2-cyclohexanedimethanol; 1,3-cyclohexanedimethanol; 1,4-cyclohexanedimethanol; 2-methyl-1,3-propanediol; TMCD; 2,2,4-trimethyl-1,3-pentanediol; hydroxypivalyl hydroxypivalate; 2-butyl-2-ethyl-1,3-propanediol; 1,4-butanediol; 1,6-hexanediol; or combinations thereof.

Desirably, in any of the embodiments of the invention, the (a)(ii) polyhydroxyl compound having 3 or more hydroxyl groups include 1,1,1-trimethylol propane, 1,1,1-trimethylolethane, glycerin, pentaerythritol, or combinations thereof.

Desirably, in any of the embodiments of the invention, the (b)(i) α,β-unsaturated polycarboxylic acid compounds include any of the aforementioned α,β-unsaturated polycarboxylic acid compounds, such as maleic acid or its anhydride, crotonic acid or its anhydride, itaconic acid or its anhydride, citraconic acid or its anhydride, aconitic acid, aconictic anahydride, oxalocitraconic acid and its anhydride, mesaconic acid or its anhydride, malic acid or its anhydride, 1,4-dihydronaphthalene-2,3-dicarboxylic acid, phenyl maleic acid or its anhydride, t-butyl maleic acid or its anhydride, monomethyl fumarate, monobutyl fumarate, methyl maleic acid or its anhydride, mesconic acid or its anhydride, or mixtures thereof.

Desirably, in any of the embodiments of the invention, the (b)(ii) compounds include isophthalic acid (or dimethyl isophthalate), 1,4-cyclohexanedicarboxylic acid, 1,3-cyclohexanedicarboxylic acid, adipic acid; phthalic acid; or combinations thereof.

The unsaturated curable polyester I can be prepared by any conventional process for the preparation of polyesters. For example, the polyhydroxyl compounds (a) can be combined with the polycarboxyl compounds (b) in a reaction vessel under heat to form a reaction mixture comprising the unsaturated curable polyester I in a batch or continuous process and in one or more stages, optionally with the continuous removal of distillates and applied vacuum during at least part of the residence time.

Polyhydroxyl compounds (a) and polycarboxyl compounds (bi) are combined and reacted in at least one reactor at a temperature from 180-250° C., optionally in the presence of an acid catalyst. Desirably, a distillate is removed from the reactor.

The process for the manufacture of the polyester intermediate composition can be batchwise or continuous. The reaction of the polyhydroxyl compounds (a) and the polycarboxyl compounds (b) may be carried out in a melt phase process using conventional polyester polymerization conditions. The polyhydroxyl compounds and polycarboxylic acid compounds are combined to form a reaction mixture, and the reaction mixture is reacted in an esterification reactor at a temperature from 180-250° C. The esterification reaction many take place in one or more esterification reactors. The polyester composition can be made by a transesterification (ester interchange) reaction or by direct esterification. For example, polycarboxylic acid compounds (for direct esterification) or ester forms of the polycarboxylic acid compounds (for transesterification), and the polyhydroxyl compounds can be fed to an esterification reactor either in a combined stream, separate streams, or a combination of a combined and separate stream, and reacted at elevated temperatures, typically, from about 180° C. to about 250° C. While temperatures in excess of 250° C. can be employed, such as temperature up to 280° C., in many instances color bodies and degradation products start to form at temperatures exceeding 250° C. Desirably, the reaction mixture is reacted at any temperature within a range from about 180° C. to about 230° C. In the esterification reactor, the temperature of the reaction mixture to form the polyester intermediate composition may be static or may be increased stepwise or continuously if desired.

It is desirable to start the reaction at a temperature below 210° C., or at 200° C. or less, or even at 180° C. or less, and increase the temperature over the total residence time of the reaction mixture for making the polyester intermediate composition in order to avoid generating more water by-product than the distillate collection system can efficiently remove. To assist driving the reaction of the polyhydroxyl component and acid component to completion, it is desirable to react about 1.05 to about 1.6, or 1.1-1.5, or 1.1-1.4 equivalents of polyhydroxyl compounds (b) to one equivalent of the polycarboxylic acid compounds (b). Desirably, a distillate is removed from the reactor. The esterification reactor should be equipped with, and the process for making the polyester intermediate composition operated with, a distillate collection system for removing esterification or ester-exchange vapor by-products since their removal will assist with shifting the equilibrium reaction to the formation of the ester. The typical by-products formed in esterification are water in direct esterification routes, alcohols in transesterification routes, along with other reaction by-products such as aldehydes and color bodies.

The method for the removal of reaction by-products is not limited. A common method for the removal of esterification reaction by-products is a vacuum system connected to the esterification reaction zone in the reactor with a direct contact spray condenser, which is useful when a vacuum is applied to the esterification reaction zone in the esterification reactor, or a distillation column that is packed or contains trays in vapor communication with the esterification vessel for the separation of water from other reaction by-products.

The process for making the polyester can be conducted under a pressure within a range of 0 psig or atmospheric to about 200 psig, or from about 0 psig to about 100 psig, or from 0 psig to 40 psig. However, if desired, at least a portion or the entire residence time of the reaction to make the polyester composition can proceed under a vacuum, especially during polycondensation. If a vacuum is applied to only a portion of the residence time, it can be applied starting when at least 30%, or at least 50%, or at least 75%, or at least 80%, or at least 90% of the residence time for making the polyester. By applying a vacuum, the removal of water or alcohol condensate can be further enhanced, and the molecular weight Mn of the polyester can be increased. If a vacuum is applied, suitable pressures can range from 759 torr down to 0.5 torr, or 600 torr down to 0.5 torr, or 450 torr down to 0.5 torr. Vacuum can be increased with the residence time of the reaction mixture. Alternatively or in addition to the application of a vacuum, the removal of the reaction by-products can be purged or swept with an inert gas during all or a portion of the reaction. An inert gas is any gas which does not cause unwanted reaction or product characteristics at reaction conditions. Suitable gases include, but are not limited to, carbon dioxide, argon, helium, and nitrogen.

The esterification vessel can be agitated if desired to assist with the mass transfer of reactants and disengagement of reaction by-products.

The reaction to make the polyester is facilitated by reacting the polyhydroxyl compounds (a) and the polycarboxylic acid compounds (b) in the presence of appropriate catalysts such as, for example, alkoxy titanium compounds, alkali metal hydroxides and alcoholates, salts of organic carboxylic acids, alkyl tin compounds, metal oxides, and other metal carboxylates or benzoates such as zinc, manganese, or magnesium acetates or benzoates. A typical catalyst is an organometallic acid catalyst, such as, for a carboxylate of tin, e.g. butylstannoic acid. The amount of the catalyst added may be determined by routine experimentation as understood by those skilled in the art. The catalyst can be added in amounts ranging from about 0.01 to 1.0 weight percent, based on the total weight of the reactants.

In a continuous process, the polycarboxylic acid compounds and the polyhydroxyl compounds are continuously fed to the esterification reactor, the polyester intermediate composition is continuously withdrawn from the esterification reactor and fed to a second esterification reactor continuously to form the unsaturated curable polyester composition, and the unsaturated curable polyester composition is continuously withdrawn from the second esterification reactor.

Additives can be added to the reactor or reaction mixture to enhance the performance properties of the unsaturated curable polyester polymer. For example, crystallization aids, impact modifiers, surface lubricants, denesting agents, stabilizers, antioxidants, ultraviolet light absorbing agents, metal deactivators, colorants, nucleating agents, acetaldehyde lowering compounds, reheat rate enhancing aids such as elemental antimony or reduced antimony or reducing agents to form such species in situ, silicon carbide, carbon black, graphite, activated carbon, black iron oxide, red iron oxide and the like, sticky bottle additives such as talc, and fillers and the like can be included. All of these additives and many others and their use are well known in the art and do not require extensive discussion. Any of these compounds can be used in the present composition.

There is also provided a solvent containing (as distinguished from an aqueous based coating) coating composition, comprising:
I) the unsaturated curable polyester resin of the present invention,
II) a crosslinker comprising a resole phenolic resin, and
III) an organic solvent.

Suitable organic solvents for the solvent-based coating composition include xylene, ketones (for example, methyl amyl ketone), 2-butoxyethanol, ethyl-3-ethoxypropionate, toluene, butanol, cyclopentanone, cyclohexanone, ethyl acetate, butyl acetate, and other volatile inert solvents typically used in industrial baking (i.e., thermosetting) enamels, mineral spirits, naptha, toluene, acetone, methyl ethyl ketone, methyl isoamyl ketone, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate (available commercially from Eastman Chemical Company under the trademark TEXANOL™), or combinations thereof. The coating composition also may comprise reactive solvents such as, for example, diallyl phthalate, SANTOLINK™ XI-100 polyglycidyl allyl ether (available from Cytec), and others as described, for example, in U.S. Pat. Nos. 5,349,026 and 5,371,148.

The amount of solvent (other than water) is desirably at least 20 wt. %, or at least 25 wt. %, or at least 30 wt. %, or at least 35 wt. %, or at least 40 wt. %, or at least 45 wt. %, or at least 50 wt. %, or at least 55 wt. % based on the weight of the solvent containing coating composition. Additionally or in the alternative, the amount of organic solvent can be up to 85 wt. % based on the weight of the coating composition. Solvent containing coating compositions desirably contain 10 wt. % or less, or 8 wt. % or less, or 5 wt. % or less, or 3 wt. % or less water, based on the weight of the coating composition.

The acid numbers are not particularly limited, but desirably are less than 50, or less than 30, or less than 20, or less than 10, or even less than 5 mg KOH/g, in order to provide improved solubility and lower solution viscosity.

There is further provided an aqueous dispersion, comprising
a) a unsaturated curable polyester resin as described in the invention,
b) a neutralizing agent, and
c) water.

In aqueous dispersions or waterborne compositions, the unsaturated curable polyester can contain the residues of one or more hydrophilic monomers such as 5-sodiosulfoisophthalic acid, polyetheylene glycol, or Ymer™ N120 (available from Perstorp).

The unsaturated curable polyesters in aqueous or waterborne compositions desirably have high acid numbers (e.g. at least 30, or at least 40, or at least 50, and up to 120 mg KOH/g) and can be neutralized with a base. Neutralization of a polymer means to neutralize carboxylic acid end groups, acetoacetate residues, or the alkali metals cations.

The amount of water is desirably at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. % based on the weight of the aqueous dispersion.

The neutralizing agent may be an amine or an inorganic base. Typical amines include ammonia, trimethylamine, diethylamine, monoethanolamine, monoisopropanolamine, morpholine, ethanolamine, diethanolamine, triethanolamine, N,N-dimethylethanolamine, N, N-diethylethanolamine, N-methyldiethanolamine and the like.

Typical inorganic bases include bases derived from alkali metals and alkaline earth metals such as, for example, sodium, potassium, magnesium, calcium, and other basic metal compounds. Suitable bases from this first class of bases useful in the present invention include, but are not limited to, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate.

The aqueous dispersion of this invention may and desirably further comprise an organic co-solvent. Suitable co-solvents include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents. If an organic co-solvent is used, the amount is desirably 40 wt. % or less, or 30 wt. % or less, or 15 wt. % or less, or 10 wt. %, or 5 wt. % or less based on the weight of the aqueous composition, and at least 1 wt. %, or at least 3 wt. % based on the weight of the aqueous composition.

Aqueous dispersions of the polyesters of the present invention are typically prepared by dispersing the unsaturated curable polyester resins with water in the presence of organic co-solvent(s) (e.g. at least 1 or 3 wt. % and up to 15 wt. % based on the weight of the polyester polymers), at a temperature ranging from about 60 to about 95° C. under ambient pressure. The dispersing process may be carried out either by gradually adding the resin to the heated mixture of water, the neutralizing agent, and the co-solvent(s) or by gradually adding water and the neutralizing agent to the heated mixture of the resin and the co-solvent(s). The former method is preferred for resins with a high Tg (e.g. >60° C.), which can be pulverized, for example, by using a blender and subsequently added to the heated water and the neutralizing agent. For resins with a lower Tg, it is preferred to add water and the neutralizing agent to the heated resin mixture containing the co-solvent. After the completion of adding either resin or water, the stirring is allowed to continue until a homogeneous dispersion is obtained. The process typically takes one or several hours. It is intended for this terminology to include conditions where the polyester is dissolved to form a true solution as well as those where the polyester is dispersed within the aqueous medium. Often, due to the statistical nature of polyester compositions, it is possible to have a soluble fraction and a dispersed fraction when a single polyester sample is placed in an aqueous medium.

Desirably, the dispersion contains at least 3 wt. %, or at least 5 wt. %, or at least 10 wt. %, or at least 15 wt. %, or at least 20 wt. %, or at least 25 wt. %, or at least 30 wt. % unsaturated curable polyester resin based on the weight of the aqueous dispersion. Additionally or in the alternative, the dispersion contains up to 80 wt. %, or up to 60 wt. %, or up to 50 wt. %, or up to 40 wt. % unsaturated curable polyester resin. Suitable ranges of unsaturated curable polyester resin in wt. % based on the weight of the dispersion include 3-80, or 5-80, or 10-80, or 5-80, or 10-80, or 15-80, or 20-80, or 25-80, or 30-80, or 3-60, or 5-60, or 10-60, or 5-60, or 10-60, or 15-60, or 20-60, or 25-60, or 30-60, or 3-50, or 5-50, or 10-50, or 5-50, or 10-50, or 15-50, or 20-50, or 25-50, or 30-50, or 3-45, or 5-45, or 10-45, or 5-45, or 10-45, or 15-45, or 20-45, or 25-45, or 30-45.

As a further aspect, this invention provides a curable waterborne coating composition, comprising:
I) the polyester of the present invention having acid number about 50 to about 120 mg KOH/g;
II) a resole phenolic crosslinking resin;
III) a neutralizing agent; and
IV) water.

Unsaturated curable polyester resins having glass transition temperature (Tg) greater than about 50° C. are suitable for powder coating application. The polyester of the present invention comprises TACD, which is capable of providing higher Tg.

Although the coating composition contains at least a resole phenolic resin as a crosslinker, the thermosetting composition may also contain other crosslinking agents, such as amino types of crosslinkers. Suitable amino crosslinkers include hexamethoxymethylmelamine, tetramethoxymethylbenzoguanamine, tetramethoxymethylurea, mixed butoxy/methoxy substituted melamines, and the like. Thus, in another embodiment, the thermosetting composition of the invention further comprises about 5 to 30 weight % of an amino resin, based on the total weight of polyester, phenolic, and amino resins.

The thermosetting compositions of the invention can also contain one or more leveling, rheology, and flow control agents such as silicones, fluorocarbons or cellulosics; flatting agents; rubber; pigment wetting and dispersing agents; catalysts, surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005.

The thermosetting composition of the present invention desirably further contains an acid catalyst in an amount ranging from 0.1 to 2 weight %, based on the total weight of polyester and phenolic resin. Examples of acid catalyst include protonic acids such as p-toluenesulfonic acid, dinonylnaphthalene disulfonic acid, dodecylbenzenesulfonic acid, phosphoric acid, and the like. The acid catalyst may also be Lewis acid or amine-blocked acid catalyst.

The thermosetting composition may contain natural rubber, synthetic rubber, or a combination of both.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corporation Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

The coating composition may also comprise at least one pigment. Typically, the pigment is present in an amount of about 20 to about 60 weight percent, based on the total weight of the composition. Examples of pigments include those generally recognized by persons of ordinary skill in the art of surface coatings. For example, the pigment may be a typical organic or inorganic pigment, especially those set forth in the *Colour Index,* 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Colorants such as, for example, phthalocyanine blue, molybdate orange, or carbon black also may be added to the coating composition. For example, the solventborne, thermosetting coating formulations can contain titanium dioxide as the pigment.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 μm), or 0.5 to 3, or 0.5 to 2, or 0.5 to 1 mils on the substrate. The coating can be cured at ambient (room) temperature or heated to a temperature of about 50° C. to about 230° C., or desirably from 150° C. to 230° C., for a time period that typically ranges about 5 to about 90 minutes and allowed to cool. Further examples of typical application and curing methods can be found in U.S. Pat. Nos. 4,737,551 and 4,698,391 and 3,345,313.

In addition to coating application, the thermosetting composition of this invention can also be used for other applications, such as adhesive, plastic molding, rubber compounding, or in any application where the formation of a polymeric network is desirable.

The invention is further illustrated by the following examples.

EXAMPLES

Example 1. Synthesis of Unsaturated Polyester (Resin 1) (NPG Based, Branched)

A 500 mL, three-neck, round-bottom flask was equipped with a mechanical stirrer, a heated partial condenser, a Dean-Stark trap, and a water condenser. To the flask were charged neopentyl glycol (NPG) (68.82 g, 0.662 mole); trimethylolpropane (TMP) (4.44 g, 0.033 mole); isophthalic acid (IPA) (59.17 g, 0.356 mole); maleic anhydride (MA) (17.47 g, 0.178 mole), and the acid catalyst, Fascat-4100 (Arkema Inc.) (0.22 g). The reaction was allowed to react under nitrogen at 180° C. for 55 min., at 200° C. for 50 min., at 220° C. for 85 min., and at 230° C. for about 2.5 hours to yield a clear, viscous mixture. A total of 13.5 mL of distillate was collected in the Dean-Stark trap. The resulting mixture was allowed to cool to room temperature and subsequently collected. Acid number: <1.0 mgKOH/g; hydroxyl number: 64.0 mgKOH/g; glass transition temperature (Tg): 39.9° C.; number average molecular weight (Mn): 2865; weight average molecular weight (Mw): 60323.

Example 2. Synthesis of Unsaturated Polyester (Resin 2) (NPG/TMCD Based, Branched)

A 500 mL, three-neck, round-bottom flask was equipped with a mechanical stirrer, a heated partial condenser, a Dean-Stark trap, and a water condenser. To the flask were charged 2,2,4,4-tetramethylcyclobutane-1,3-diol (TMCD) (47.64 g, 0.331 mole), neopentyl glycol (NPG) (34.41 g, 0.331 mole); trimethylolpropane (TMP) (4.44 g, 0.033 mole); isophthalic acid (IPA) (59.17 g, 0.356 mole); maleic anhydride (MA) (17.47 g, 0.178 mole), and the acid catalyst, Fascat-4100 (Arkema Inc.) (0.24 g). The reaction was allowed to react under nitrogen at 180° C. for 75 min., at 200° C. for 2 hours, at 220° C. for 50 min., and at 230° C. for about 80 min. to yield a clear, viscous mixture. A total of 15.5 mL of distillate was collected in the Dean-Stark trap. The resulting mixture was allowed to cool to room temperature and subsequently collected. Acid number: <1.0 mgKOH/g; hydroxyl number: 88.8 mgKOH/g; glass transition temperature (Tg): 51.5° C.; number average molecular weight (Mn): 2312; weight average molecular weight (Mw): 11538.

Example 3. Synthesis of Unsaturated Polyester (Resin 3) (NPG/TMCD Based, Linear)

A 500 mL, three-neck, round-bottom flask was equipped with a mechanical stirrer, a heated partial condenser, a Dean-Stark trap, and a water condenser. To the flask were charged 2,2,4,4-tetramethylcyclobutane-1,3-diol (TMCD) (47.64 g, 0.331 mole), neopentyl glycol (NPG) (34.41 g, 0.331 mole); isophthalic acid (IPA) (59.17 g, 0.356 mole); maleic anhydride (MA) (17.47 g, 0.178 mole), and the acid catalyst, Fascat-4100 (Arkema Inc.) (0.24 g). The reaction was allowed to react under nitrogen at 180° C. for 30 min., at 200° C. for 65 min., at 220° C. for 75 min., and at 230° C. for about 2 hours to yield a clear, viscous mixture. A total of 17.5 mL of distillate was collected in the Dean-Stark trap. The resulting mixture was allowed to cool to room temperature and subsequently collected. Acid number: <2.2 mgKOH/g; hydroxyl number: 48.8 mgKOH/g; glass transition temperature (Tg): 61.2° C.; number average molecular weight (Mn): 4354; weight average molecular weight (Mw): 28180.

Example 4. Formulation and Evaluation of Curing of Resins 1-3 with Various Phenolic Resins Polyester resin solutions (35% solids) were prepared by dissolving resins 1-3 respectively in methyl amyl ketone (MAK). Separately, phenolic resins solutions (50% solids)

were prepared by dissolving SP-103 and HRJ-1367 (both from SI Group) respectively in MAK. Formulations (polyester/phenolic=70/30) were then prepared by mixing each polyester resin solution (10 g, 35% in MAK) with various phenolic resins respectively and p-toluenesulfonic acid (pTSA) (0.5 g, 5% in isopropanol). Besides SP-103 and HRJ-1367, the phenolic resins used were Phenodur PR516/60B (60% in n-butanol) and Phenodur PR371/70B (70% in n-butanol), both from Allnex. According to ventor's literature, Phenodur PR371/70B is based on unsubstituted phenol.

Evaluation of Curing:

Each of the above formulations was drawn down on a Bonderite 1000 cold-rolled steel test panel (ACT Test Panel Technologies) using a drawdown bar. The coated panels were baked at 205° C. for 10 min. The coatings (dried film thickness: about 20 μm) were then evaluated for curing by MEK double rubs (ASTM D4752). The results are listed in Table 1.

TABLE 1

Curing Evaluation of Formulations Based on Polyester Resins 1-3 and Various Phenolic Resins (Polyester/Phenolic = 70/30) by MEK Double Rubs

| Formulation | SP-103 | HRJ-1367 | PR516/60B | PR371/70B |
|---|---|---|---|---|
| Resin 1 | Moderate mar at 20 double rubs | Moderate mar at 30 | Moderate mar at 100 | No effect at 500 |
| Resin 2 | Moderate mar at 30 | Moderate mar at 40 | Slight mar at 50 | No effect at 500 |
| Resin 3 | severe mar at 20 | severe mar at 50 | Moderate mar at 400 | No effect at 500 |

Additionally, formulations having polyester/phenolic=50/50 were prepared by mixing polyester resin 3 solution (7.14 g, 35% in MAK) with various phenolic resins respectively and p-toluenesulfonic acid (pTSA) (0.5 g, 5% in isopropanol). The formulations were evaluated for curing as described above. The results are listed in Table 2.

TABLE 2

Curing Evaluation of Formulations Based on Polyester Resins 3 and Various Phenolic Resins (Polyester/Phenolic = 50/50) by MEK Double Rubs

| Formulation | SP-103 | HRJ-1367 | PR516/60B | PR371/70B |
|---|---|---|---|---|
| Resin 3 | Moderate mar at 50 double rubs | Slight mar at 20 | Slight mar at 100 | No effect at 500 |

Example 5. Synthesis of Waterborne Unsaturated Polyester (Resin 4)

A 500 mL, three-neck, round-bottom flask was equipped with a mechanical stirrer, a heated partial condenser, a Dean-Stark trap, and a water condenser. To the flask were charged neopentyl glycol (NPG) (61.0 g, 0.586 mole); trimethylolpropane (TMP) (3.94 g, 0.0294 mole); isophthalic acid (IPA) (50.1 g, 0.3015 mole); maleic anhydride (MA) (14.6 g, 0.1485 mole), and the acid catalyst, Fascat-4100 (Arkema Inc.) (0.19 g). The reaction was allowed to react under nitrogen at 180° C. for 15 min., at 200° C. for one hour, at 220° C. for 2 hours, and at 230° C. for about 95 min. to yield a clear, viscous mixture. A total of 11.5 mL of distillate was collected in the Dean-Stark trap. The resulting mixture was allowed to cool to 140° C.; trimellitic anhydride (TMA) (12.33 g, 0.0642 mole) was then added. The reaction was allowed to continue at 170 C for 2 hours and subsequently isolated. Acid number: 48.8 mgKOH/g; hydroxyl number: 41.9 mgKOH/g; glass transition temperature (Tg): 51.7° C.; number average molecular weight (Mn): 2796; weight average molecular weight (Mw): 19620.

Example 6. Preparation of Aqueous Dispersions of Polyester Resin 4

A Parr reactor was used for the preparation of the resin dispersion. Polyester resin 4 was first ground to about 6 mm pellets. The resin pellets (42.0 g) was then placed in the reaction vessel along with distilled water (78.0 g) and DMEA (3.34) for neutralization. The amount of DMEA needed for neutralization is calculated according to the measured acid number of the resin being dispersed. The Parr reactor was then assembled and heated first to 95° C. and then to 110° C. The stirring was allowed to continue at 110° C. for 45 min. and subsequently allowed to cool to 50° C. The resulting dispersion was filtered with a standard paint filter and collected to yield a milky dispersion (35% solids).

What we claim is:

1. A thermosetting composition comprising:
   I) an unsaturated curable polyester comprising the residues of:
      a) polyhydroxy compounds comprising:
         (i) a diol in an amount of 70 mole % to 99 mole %; and
         (ii) a polyhydroxyl compound having 3 or more hydroxyl groups in an amount of 1 mole % to 30 mole %;
         wherein the amount of (a)(i) and (a)(ii) are based on the molar total of (b) polyhydroxyl compounds; and
      b) polycarboxylic compounds comprising:
         (i) an α,β-unsaturated polycarboxylic acid compound in an amount of 10 mole % to 60 mole %, said α,β-unsaturated polycarboxylic acid compound having at least two carboxylic acid groups or at least one anhydride group, and having at least one unsaturation in a position that is α,β relative to a carbonyl group and not located on an aromatic ring; and
         (ii) a polycarboxylic acid compound other than the (b)(i) α,β-unsaturated polycarboxylic acid compound in an amount of 40 mole % to 90 mole % wherein the amount of (b)(i) and (b)(ii) are based on the molar total of polycarboxylic compound (b); and
   II) a resole phenolic resin having at least one methylol group.

2. The thermosetting composition of claim 1, wherein at least a portion of the methylol groups are in the ortho position relative to a phenolic hydroxyl group.

3. The thermosetting composition of claim 1, wherein the phenolic resin is obtained by the reaction of phenolic compounds and an aldehyde at an aldehyde:phenol ratio of at least 1.1:1.

4. The thermosetting composition of claim 1, wherein the phenolic resin has at least one methylol substituent in the ortho position relative to the phenolic hydroxyl group.

5. The thermosetting composition of claim 1, wherein the phenolic resin contains an average of one o-methylol substituent per phenolic hydroxyl group.

6. The thermosetting composition of claim 3, wherein the phenolic resin is the reaction product of phenolic compounds with formaldehyde.

7. The thermosetting composition of claim 1, wherein α,β-unsaturated polycarboxylic acid compound comprises maleic anhydride, maleic acid, fumaric acid, itaconic anhydride, itaconic acid, citraconic anhydride, citraconic acid, aconitic acid, aconitic anahydride, oxalocitraconic acid, oxalocitraconic anhydride, mesaconic acid, mesaconic anhydride, beta-acylacrylic acid, beta-acylacrylic anhydride, phenyl maleic acid, phenyl maleic anhydride, t-butyl maleic acid, t-butyl maleic anhydride, monomethyl fumarate, monobutyl fumarate, methyl maleic acid, methyl maleic anhydride, or mixtures thereof.

8. The thermosetting composition of claim 1, wherein the α,β-unsaturated polycarboxylic acid compound comprises maleic acid or maleic anhydride.

9. The thermosetting composition of claim 1, wherein said unsaturated curable polyester contains at least one non-terminal ethylenically unsaturated bond in an α,β position relative to an ester group in the polymer.

10. The thermosetting composition of claim 1, wherein the unsaturated curable polyester contains ethylenically unsaturated carbons pendant to the polymer backbone.

11. The thermosetting composition of claim 1, wherein the unsaturated curable polyester contains ethylenically unsaturated carbons that are within the linear polymer backbone.

12. The thermosetting composition of claim 1, wherein the unsaturated curable polyester does not contain terminal or vinyl unsaturation.

13. The thermosetting composition of claim 1, wherein said unsaturated polyester is not made with a monocarboxylic acid compound having a vinyl group.

14. The thermosetting composition of claim 1, wherein the unsaturated polyester contains residues of α,β-unsaturated polycarboxylic acid compound in an amount of at least 5 mole % based on the total moles of the components of the polyester.

15. The thermosetting composition of claim 1, wherein the unsaturated curable polyester contains residues of α,β-unsaturated polycarboxylic acid compound in an amount of 10 to 25 mole % based on the total moles of the components of the unsaturated curable polyester.

16. The thermosetting composition of claim 1, wherein the amount of α,β-unsaturated polycarboxylic acid compound is 30 to 40 mole %, based on 100 mole % of all polycarboxylic compounds (b).

17. The thermosetting composition of claim 1, wherein the polycarboxylic acid compounds (bii) comprise isophthalic acid, dimethyl isophthalate, terephthalic acid, dimethyl terephthalate, phthalic acid, phthalic anhydride, 1,4-cyclohexanedicarboxylic acid, 1,3-cyclohexanedicarboxylic acid, adipic acid, 2,6-naphthalenedicarboxylic acid, 1,4-naphthalenedicarboxylic acid, 2,5-naphthalene-dicarboxylic acid, hexahydrophthalic anhydride, tetrahydrophthalic anhydride, trimellitic anhydride, succinic anhydride, succinic acid, or mixtures thereof.

18. The thermosetting composition of claim 17, wherein the polycarboxylic acid compounds (bii) comprise isophthalic acid, dimethyl isophthalate, phthalic acid, phthalic anhydride, 1,4-cyclohexanedicarboxylic acid, adipic acid, hexahydrophthalic anhydride, tetrahydrophthalic anhydride, trimellitic anhydride, or mixtures thereof.

19. The thermosetting composition of claim 1, wherein the unsaturated polyester contains residues of polycarboxylic compounds, other than α,β-unsaturated polycarboxylic acid compounds, present in an amount of 10 to 25 mole % based on the total moles of the components of the unsaturated curable polyester.

20. The thermosetting composition of claim 1, wherein the amount of polycarboxylic compounds (b)(ii) is 50 to 80 mole %, based on 100% of all moles of the polycarboxylic compounds (b).

21. The thermosetting composition of claim 1, wherein all of the polyhydroxyl compounds (a) are hydrocarbons and do not contain atoms other than hydrogen, carbon and oxygen.

22. The thermosetting composition of claim 1, wherein the diols (a)(i) comprise 2,2,4,4-tetraalkylcyclobutane-1,3-diol (TACD).

23. The thermosetting composition of claim 1, wherein the diols (a)(i) comprise 2,2-dimethyl-1,3-propanediol (neopentyl glycol).

24. The thermosetting composition of claim 1, wherein the diols (a)(i) are present in an amount of 80 to 98 mole %, based on 100 mole % of all polyhydroxyl compounds (a).

25. The thermosetting composition of claim 1, wherein the unsaturated polyester contains residues of the diols in an amount of 37 to 49 mole % based on the total moles of the components of the unsaturated polyester.

26. The thermosetting composition of claim 1, wherein the polyhydroxyl compounds comprise polyhydroxyl compounds (a)(ii) having 3 or more hydroxyl groups, said polyhydroxyl compounds (a)(ii) comprising 1,1,1-trimethylol propane, 1,1,1-trimethylolethane, glycerin, pentaerythritol, erythritol, threitol, dipentaerythritol, sorbitol, or mixtures thereof.

27. The thermosetting composition of claim 1, wherein the amount of polyhydroxyl compounds (a)(ii) is 2 to 15 mole %, based on 100 mole % of all polyhydroxyl compounds (a).

28. The thermosetting composition of claim 1, wherein the unsaturated polyester contains residues of polyhydroxyl compounds having at least 3 hydroxyl groups present in an amount of 1 to 10 mole % based on the total moles of the components of the unsaturated polyester.

29. The thermosetting composition of claim 1, wherein none of the polyhydroxyl compounds (a) contain any ester or carboxyl (—COO—) groups.

30. The thermosetting composition of claim 1, wherein none of the polyhydroxyl compounds (a) have any carbonyl groups (—CO—).

31. The thermosetting composition of claim 1, wherein none of the polyhydroxyl compounds (a) contain any ether groups.

32. The thermosetting composition of claim 1, wherein the unsaturated polyester has an acid number in a range of 0-10 mg KOH/g.

33. The thermosetting composition of claim 1, wherein the unsaturated polyester has an acid number of 40-120 mg KOH/g.

34. The thermosetting composition of claim 1, wherein the unsaturated polyester has a hydroxyl number in the range of 40 to 100.

35. The thermosetting composition of claim 1, wherein the unsaturated polyester has a Tg within a range of 35° C. to 60° C.

36. The thermosetting composition of claim 1, wherein the unsaturated polyester has an Mn within a range of 1,100 to 3,000 g/mole.

37. The thermosetting composition of claim 1, comprising:
I) an unsaturated curable polyester resin comprising the residues of:
a) polyhydroxyl compounds comprising:
(i) diol compounds in an amount ranging from 85 to 98 mole %; and
(ii) polyhydroxyl compounds having at least three hydroxyl groups in an amount ranging from 2 to 15 mole %;
wherein the amount of (a)(i) and (a)(ii) are based on the total moles of polyhydroxyl compounds (a); and
(b) polycarboxyl compounds comprising
(i) α,β-unsaturated polycarboxylic acid compounds in an amount ranging from 25 to 50 mole %; and
(ii) polycarboxyl compounds other than (b)(i) in an amount ranging from 50 to 75 mole %;
wherein the amount of (b)(i) and (b)(ii) are based on the total moles of polycarboxyl compounds (b)
II) a resole phenolic resin substituted with at least one methylol group.

38. The thermosetting composition of claim 37, wherein said phenolic resin comprises a resole phenolic resin based on unsubstituted phenol and/or meta-substituted phenol.

39. The thermosetting composition of claim 37, wherein said phenolic resin comprises a resole phenolic resin based on unsubstituted phenol.

40. The thermosetting composition of claim 37, wherein the unsaturated curable polyester has an acid number ranging from 0 to 5 or 35-60 mg KOH/g, a hydroxyl number ranging from 30-90 mg KOH/g.

41. The thermosetting composition of claim 37, wherein the (a)(i) diol comprises TMCD.

42. The thermosetting composition of claim 37, wherein the (a)(ii) polyhydroxyl compound comprises 1,1,1-trimethylol propane, 1,1,1-trimethylolethane, glycerin, pentaerythritol, or combinations thereof.

43. The thermosetting composition of claim 37, wherein the (b)(i) α,β-unsaturated polycarboxylic acid compounds comprise maleic anhydride, maleic acid, fumaric acid, itaconic anhydride, itaconic acid, citraconic anhydride, citraconic acid, aconitic acid, aconitic anahydride, oxalocitraconic acid, oxalocitraconic anhydride, mesaconic acid, mesaconic anhydride, beta-acylacrylic acid, beta-acylacrylic anhydride, phenyl maleic acid, phenyl maleic anhydride, t-butyl maleic acid, t-butyl maleic anhydride, monomethyl fumarate, monobutyl fumarate, methyl maleic acid, methyl maleic anhydride, or mixtures thereof.

44. The thermosetting composition of claim 37, wherein the polycarboxyl (b)(ii) compounds comprise isophthalic acid, dimethyl isophthalate, 1,4-cyclohexanedicarboxylic acid, 1,3-cyclohexanedicarboxylic acid, adipic acid; phthalic acid; or combinations thereof.

45. The thermosetting composition of claim 1, wherein said composition comprises:
I) the unsaturated polyester having acid number within a range of 50 to 120 mg KOH/g;
II) a resole phenolic crosslinking resin;
III) a neutralizing agent; and
IV) water.

46. The composition of claim 45, further comprising an acid catalyst in an amount ranging from 0.1 to 2 weight %, based on the total weight of polyester and phenolic resin.

47. A solvent based coating composition, comprising:
I) the unsaturated curable polyester resin of claim 1;
II) a crosslinker comprising a resole phenolic resin, and
III) an organic solvent.

48. The solvent coating composition of claim 47, wherein said organic solvent comprises xylene, 2-butoxyethanol, ethyl-3-ethoxypropionate, toluene, butanol, cyclopentanone, cyclohexanone, ethyl acetate, butyl acetate, mineral spirits, naptha, toluene, acetone, methyl ethyl ketone, methyl isoamyl ketone, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, or combinations thereof.

49. The solvent coating composition of claim 47, wherein the amount of solvent (other than water) is least 40 wt. %, based on the weight of the solvent containing coating composition.

50. The solvent coating composition of claim 47, wherein said solvent composition contains 3 wt. % or less water, based on the weight of the coating composition.

51. The solvent composition of claim 47, wherein the acid number of said unsaturated polyester is less than 5 mg KOH/g.

52. An aqueous dispersion, comprising
I) the unsaturated curable polyester resin of claim 1;
II) a neutralizing agent, and
Ill) water.

53. The aqueous dispersion of claim 52, wherein the unsaturated curable polyester contains residues of 5-sodiosulfoisophthalic acid, polyetheylene glycol, or a combination thereof.

54. The aqueous dispersion of claim 52, wherein the unsaturated polyester has an acid number of at least 50 mg KOH/g.

55. The aqueous dispersion of claim 52, wherein the amount of water is at least 50 wt. %, based on the weight of the aqueous dispersion.

56. The aqueous dispersion of claim 52, wherein the neutralizing agent comprises an amine.

57. The aqueous dispersion of claim 52, further comprising an organic co-solvent in an amount of 3 wt. % to 15 wt. % based on the weight of the unsaturated polyester.

58. The aqueous dispersion of claim 52, wherein the dispersion contains at least 25 wt. % unsaturated curable polyester resin based on the weight of the aqueous dispersion.

59. A method of forming a coating, comprising applying a thermosetting coating composition to a substrate and allowing the coating composition to cure to form a dry coating, wherein said thermosetting composition comprises the composition of claim 1, and the thickness of said dry coating is within a range of 0.1 to 2 mils.

* * * * *